(12) United States Patent
Bening

(10) Patent No.: US 6,202,319 B1
(45) Date of Patent: Mar. 20, 2001

(54) GRAIN DRYER HEAT EXCHANGER

(76) Inventor: Douglas Bening, 504 Evergreen St., Okawville, IL (US) 62271

( * ) Notice: Subject to any disclaimer, the term of this patent is extended or adjusted under 35 U.S.C. 154(b) by 0 days.

(21) Appl. No.: 09/482,258

(22) Filed: Jan. 13, 2000

(51) Int. Cl.[7] ..................................... F26B 17/12
(52) U.S. Cl. ................... 34/165; 34/168; 34/177
(58) Field of Search ............................ 34/168, 169, 177, 34/181, 165, 166, 578, 64, 513, 514, 86, 171, 65, 170, 174, 167

(56) References Cited

U.S. PATENT DOCUMENTS

| | | | | |
|---|---|---|---|---|
| 3,104,955 | | 9/1963 | Marchand | 34/168 |
| 4,045,882 | * | 9/1977 | Buffington et al. | 34/171 |
| 4,086,708 | * | 5/1978 | Westelaken | 34/65 |
| 4,257,169 | * | 3/1981 | Pierce | 34/471 |
| 4,268,971 | | 5/1981 | Noyes et al. | 34/34 |
| 4,292,743 | * | 10/1981 | Razus | 34/65 |
| 4,330,946 | * | 5/1982 | Courneya | 34/263 |
| 4,337,584 | * | 7/1982 | Johnson | 34/65 |
| 4,341,516 | * | 7/1982 | Eikerman et al | 34/170 |
| 4,398,356 | * | 8/1983 | Westelaken | 34/65 |
| 4,402,302 | * | 9/1983 | Westelaken | 34/174 |
| 4,423,557 | * | 1/1984 | Westelaken | 34/573 |
| 4,424,634 | * | 1/1984 | Westelaken | 34/167 |
| 4,446,630 | * | 5/1984 | Book | 34/65 |
| 4,452,613 | | 6/1984 | Littrell | 55/96 |
| 4,486,960 | * | 12/1984 | Maurice et al. | 34/64 |
| 4,499,669 | * | 2/1985 | Haeck | 34/102 |
| 4,509,273 | * | 4/1985 | Roisen | 34/86 |
| 4,528,761 | | 7/1985 | Kölhi | 34/35 |
| 4,583,301 | * | 4/1986 | Crowley et al. | 34/73 |
| 4,676,007 | * | 6/1987 | Good | 34/573 |
| 4,821,428 | * | 4/1989 | Good | 34/86 |
| 5,555,636 | | 9/1996 | Kramer et al. | 34/86 |
| 5,960,558 | * | 10/1999 | Bourgault | 34/495 |
| 5,979,170 | * | 11/1999 | Thorpe | 34/473 |
| 6,029,367 | * | 2/2000 | Moody | 34/212 |

OTHER PUBLICATIONS

Pamphlet: Beard Industries, *Superb Energy Miser*, date unknown.
Pamphlet: Airstream dryer, cover missing, date unknown.
Pamphlet: Sukup Manufacturing Company, *Sukup Automatic Grain Dryers*, date unknown.
Pamphlet: Delux Mfg. Co., *Delux MSF Series—Pride of the Industry*, 12/1997.
Pamphlet: Delux Mfg. Co., *Delux DP Series—Pride of the Industry*, 5/1990.
Pamphlet: Mathews Company, *Mathews Company 75 Series High Capacity Continuous Flow Grain Dryers*, date unknown.
Pamphlet: Mathews Company, *Mathews Company Low Profile/High Capacity Continuous Flow Grain Dryers*, date unknown.
Pamphlet: Grain Systems, Inc., *The Competitor Series 2000*, date unknown.

* cited by examiner

*Primary Examiner*—Pamela Wilson
(74) *Attorney, Agent, or Firm*—Howell & Haferkamp, LC

(57) ABSTRACT

A heat exchanger for use on existing grain dryers or integral to new grain dryers that recovers heat from the moist hot exhaust air leaving the grain columns and uses this recovered heat to preheat ambient air being drawn into the grain dryer via a blower. The heat exchanger utilizes heat exchange columns separated from ambient air columns by heat conductive walls. The heat conductive walls allow for a transfer of heat from the moist hot exhaust air through the heat conductive walls and into the ambient air being drawn into the grain dryer through the ambient air columns. The heat conductive walls do not allow for the mixing nor contact of the moist hot exhaust air with the ambient air. Therefore, heat is transferred to the ambient air being drawn into the grain dryer without the addition of moisture to the ambient air and the resulting decrease in moisture holding capacity that would result. The heat exchanger also has a cleansing mode whereby the grain flow can be directed to flow through the heat exchange columns thereby scrubbing or cleansing the walls of the heat exchange columns as the grain flows through the heat exchange columns and out to the bottom grain auger.

24 Claims, 5 Drawing Sheets

GRAIN DRYER HEAT EXCHANGER

BACKGROUND OF THE INVENTION (i) Field of the Invention

The present invention relates generally to grain drying equipment. In particular, the present invention relates to a heat exchanger that utilizes the moist hot exhaust air from a grain dryer to pre-heat ambient air prior to entering the blower of the grain dryer.

(ii) Description of the Related Art

Grain dryers are generally well known in the art. A typical prior art grain dryer is shown in FIG. 1. which is a cut-away view of a single blower and single plenum grain dryer. Most grain dryers in use today utilize this design or variations on it.

Grain dryers of the type shown in FIG. 1 are known in the prior art and therefore its construction and operation will only be generally described herein. The typical grain dryer is constructed from steel and sheet metal. The major components of a typical grain dryer 11 include: a blower 10, a top conveying auger 12, grain columns 14, an air plenum 16, inner porous walls 18, outer porous walls 20, a lower conveying auger 22, and an air heater and an air mixing chamber 24.

A typical grain dryer 11 operates by receiving a supply of wet or moist grain from a separate conveyor (not shown) at a top opening of the dryer and transporting the wet or moist grain across the top of the grain dryer 11 via the top conveying auger 12. The grain then flows by gravity downward from the top conveying auger 12, down through the grain columns 14 where it is dried and then to the lower conveying auger 22. The dried grain is then transported via the lower conveying auger 22 to a bottom opening of the dryer and out of the dryer 11.

The grain is dried in the grain dryer 11 via the flow of hot dry air through the grain columns 14. The grain columns 14 are separated from the air plenum 16 by the inner porous walls 18, are separated from the exterior environment of the grain dryer 11 by the outer porous walls 20, and are separated from other adjacent grain columns 14 by inner panels 26. Ambient air is drawn directly from the exterior environment of the dryer and into the grain dryer 11 via the blower 10. The blower 10 blows the ambient air through a heating chamber 24 where the ambient air is heated as it flows through the heating chamber. The heated air is then blown through an air mixing chamber 24 to ensure that the air is evenly heated. The thoroughly heated and mixed air hen flows into the air plenum 16. The action of the lower 10 blowing air into the air plenum 16 causes the air pressure in the air plenum 16 to rise to a pressure higher than that of the atmospheric pressure of the exterior environment of the grain dryer 11. The higher pressure in the air plenum 16 causes the heated air to flow through the inner porous walls 18 of the grain columns and into the columns 14. The heated air then flows through the grain that is moving downwardly through the grain columns 14 and then out through the outer porous walls 20 to the exterior environment of the grain dryer 11. When the heated air flows through the grain passing through the grain columns 14, moisture is extracted from the grain by the heated air and is conveyed to the exterior environment of the grain dryer 11. Therefore, as the grain flows downwardly through the grain columns 14 and hot air is passed from the air plenum through the inner porous walls 18, around the grain and through the grain columns 14 and out through the outer porous walls 20 to the exterior environment of the grain dryer 11, the grain is heated and moisture is removed. The desired moisture content of the grain exiting the grain dryer 11 via the lower conveying auger 22 can be controlled by altering the flow rate of grain leaving the grain dryer 11 which controls the rate that grain passes downwardly through the grain columns or by changing the temperature of the heated air being blown into the air plenum 16.

A disadvantage of this typical grain dryer 11 is that the moist hot exhaust air leaving the grain columns 14 via the outer porous walls 20 exits to the exterior environment of the grain dryer 11 while it is still at a temperature substantially above that of the ambient air being drawn into the grain dryer 11. Therefore, significant amounts of energy can be wasted by the exhausting to the exterior environment of the grain dryer 11 moist hot air that is still capable of heating grain and possibly absorbing additional moisture.

Another type of grain dryer is shown in the Noyes et al. U.S. Pat. No. 4,268,971. This grain dryer has both a heating and a cooling mode. This is accomplished by dividing the typical single air plenum into two vertically separated chambers. The grain is heated and moisture is removed in the upper half of the dryer by blowing heated air through the upper chamber of the plenum, through the inner porous walls of the upper half of the grain dryer, around the grain and through the grain columns and out through the outer porous walls of the upper half of the dryer. The grain is cooled in the lower portions of the grain columns by the blower drawing ambient air through the outer porous walls of the lower half of the grain dryer, around the hot grain and through the grain column and through the inner porous walls of the lower half of the grain dryer and into the lower chamber of the air plenum. This cooling air, which is now partially heated and containing moisture removed from the grain, is then drawn from the lower chamber of the air plenum into the blower and mixed with ambient intake air being drawn into the grain dryer to be heated and used to dry grain. This grain dryer also includes a structure for recycling the moist hot exhaust air exiting the grain drying section of the grain dryer along with partially heated air from grain cooling. The moist hot exhaust air is directed to the intake of the blower. The moist hot exhaust air is mixed with the ambient air and with the partially heated air from the second chamber of the air plenum that was utilized to cool the grain. Thereby, the air entering the heater is significantly warmer than that of the ambient air and requires less energy input from the heater section to effectuate the drying of the grain. A significant disadvantage of this grain dryer is that the moist hot exhaust air that is being mixed with the ambient air and with the partially heated air from the lower chamber of the air plenum has a high moisture content. The high moisture content is a direct result of the heating of and moisture extraction from the grain. Since moist hot exhaust air already has a higher moisture content, its additional moisture holding capability is less than that of the cooler and dryer ambient air. Likewise, the partially heated air from grain cooling also has an elevated moisture content above that of the ambient air. Therefore, while requiring less energy input to obtain a desired air temperature, the moisture removing capability of the heated air being used to dry grain is reduced. Therefore, the grain flow rate through the dryer will need to be reduced or the amount of air flowing through the grain dryer will need to be increased to compensate for the reduced moisture holding capacity of the heated air resulting in limited overall savings of energy or time, and possibly reducing grain throughput.

Some grain dryers utilize two blowers in conjunction with a two plenum grain dryer. These grain dryers also have a heating mode and a cooling mode. One blower is connected with a heating element in order to blow heated air into the upper heating air plenum and through the grain column to heat the grain and remove moisture. The other blower is utilized in conjunction with a lower cooling air plenum. The cooling mode takes ambient air and blows it into the cool air plenum and through the lower half of the grain column, thereby cooling the heated grain.

Heat recovery systems are available on these dual fan/dual plenum grain dryers. These heat recovery systems typically direct the air exiting the cooling portion of the grain dryer into the intake of the blower used in the heating section of the grain dryer The disadvantage to this type of heat recover system is that the cooling air has been partially heated by the hot grain that it is cooling and also removes additional moisture from the grain, thereby decreasing this air's moisture holding capacity below that of the ambient air in the exterior environment of the grain dryer. Therefore, while requiring less energy to heat the air mixture to the desired temperature, the moisture removing capacity of the heated air drying the grain is reduced and the grain flow rate through the dryer will need to be reduced or the amount of air flowing through the dryer increased to compensate for the lower moisture removal capability, resulting in a limited overall savings of energy or time and possibly reducing grain throughput.

BRIEF SUMMARY OF THE INVENTION

The present invention provides an improved grain dryer which overcomes the disadvantages associated with existing grain dryers by utilizing heat exchange columns to extract heat from the exhaust air. The extracted heat is transferred to the ambient air being drawn into the grain dryer by the blower via heat conductive walls that do not allow for the mixing of the exhaust air with the ambient air being drawn into the grain dryer. The heat exchanger is also suitable for use with existing grain dryers.

The grain dryer has a central air plenum and a plurality of grain columns that extend vertically across opposite sides of the air plenum. Each grain column has an inner porous wall separating the grain column from the air plenum, and an outer porous wall that is spaced outwardly from the inner porous wall and the air plenum. A plurality of heat exchange columns extend vertically along the outer porous walls of the grain columns. The heat exchange columns have heat conductive walls mounted over the outer porous walls of the grain columns and enclose interior volumes of the heat exchange columns that communicate with the grain columns through the outer porous walls. There is also a plurality of ambient air columns extending vertically along the heat exchange columns. The ambient air columns have external walls mounted over the heat conductive walls of the heat exchange columns and enclose interior volumes of the ambient air columns that receive heat from the heat exchange columns through the heat conductive walls. Thus, the grain dryer has an integral heat exchanger that recovers heat from the moist hot exhaust air that exits the grain dryer through the outer porous walls of the grain columns, and transfers the recovered heat via the heat conductive walls to ambient air being drawn into the grain dryer through the ambient air columns without mixing the moist hot exhaust air with the ambient air being drawn into the grain dryer.

The grain dryer heat exchanger is designed for assembly to an existing grain dryer, where the grain dryer has a plurality of grain columns extending across opposite sides of an air plenum, where each grain column has an inner porous wall separating the grain column from the air plenum and an outer porous wall spaced outwardly from the inner porous wall. The heat exchanger has a plurality of heat conductive walls mountable over the outer porous walls of the grain columns to form the plurality of heat exchange columns extending along the grain columns. The heat exchange columns have interior volumes that communicate with the grain columns through the outer porous walls. A plurality of external walls are mountable over the heat conductive walls of the heat exchange columns to form a plurality of ambient air columns extending along the heat exchange columns. The ambient air columns have interior volumes that receive heat from the heat exchange columns through the heat conductive walls. Thus, the grain dryer heat exchanger can be utilized on existing and new grain dryers to recover heat from the moist hot exhaust air that would otherwise go to waste.

BRIEF DESCRIPTION OF THE DRAWINGS

Other objects and features of the present invention are set forth in the following detailed description of the preferred embodiment of the invention and in the drawing figures wherein.

DESCRIPTION OF THE PREFERRED EMBODIMENTS

Figure 1:
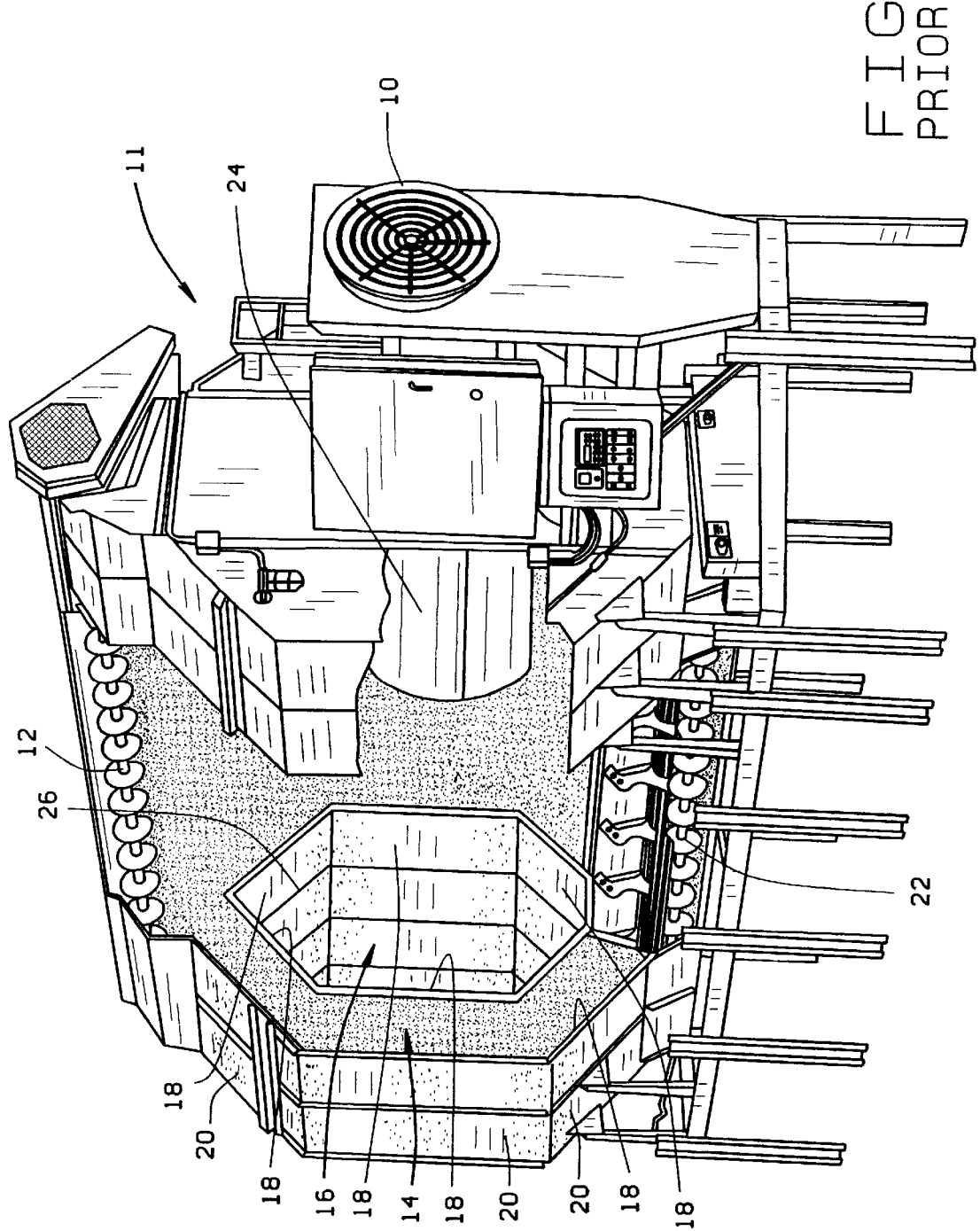
FIG. 1 is a perspective, partially cut-away view of a prior art grain dryer.
Figure 2:
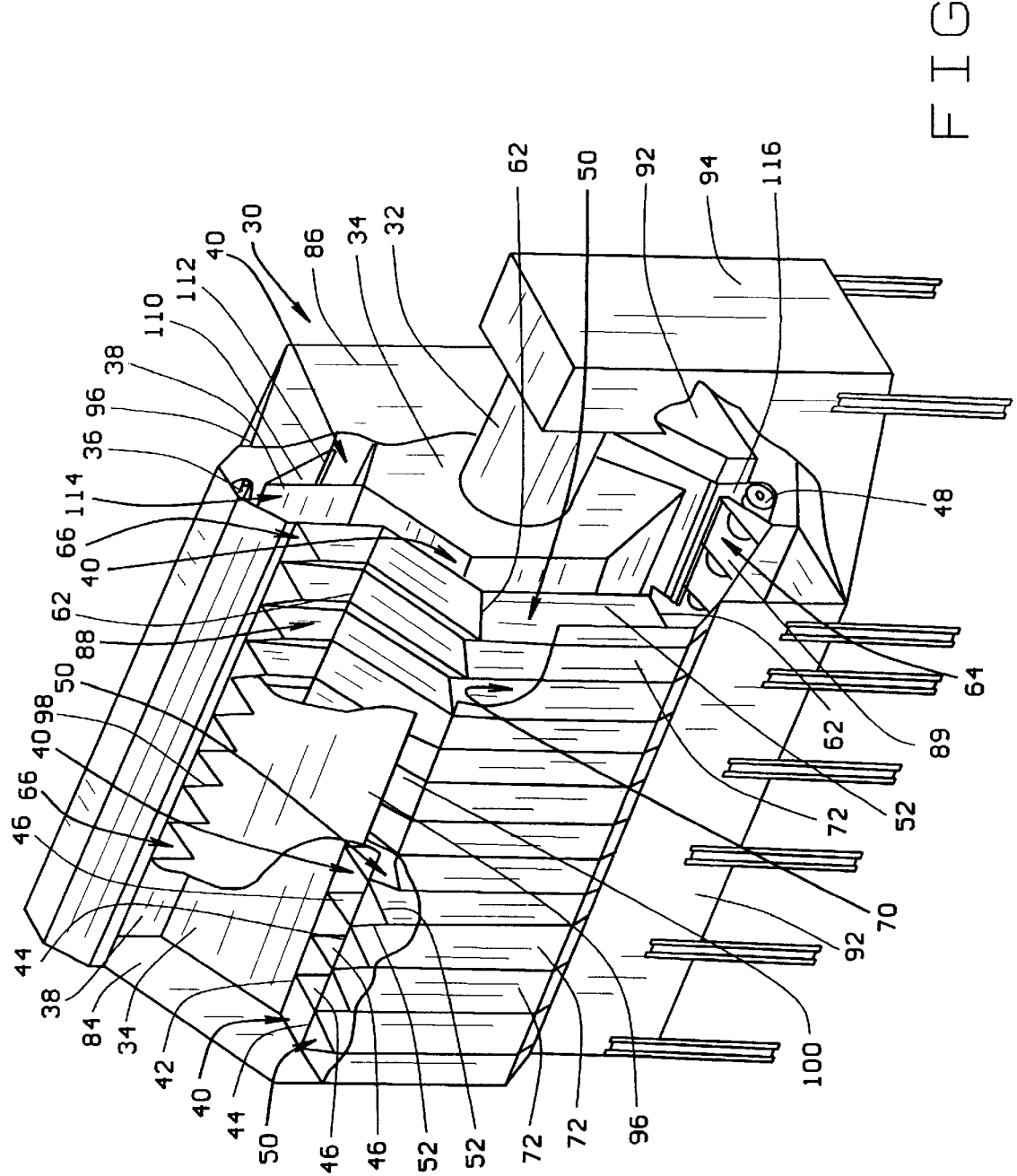
FIG. 2 is a perspective, partially cut-away schematic representation of a grain dryer with a heat exchanger of the present invention.

FIG. 2 shows the heat exchanger of the invention assembled to the exterior of a grain dryer 30. The grain dryer 30, apart from the heat exchanger of the invention to be described, is similar in construction and operation to the prior art grain dryers of the types described earlier. The grain dryer 30 of FIG. 2 is shown with a single blower 32 that blows air through a heater and mixer (not shown) into the air plenum chamber 34 at the center of the dryer. Although only the single blower 32 is shown, it should be understood that the heat exchanger of the invention may be employed with any of the other types of grain dryers that are commercially available. As in the prior art grain dryers, the grain dryer 30 has an upper auger 36 that receives moist grain from a supply exterior to the grain dryer and conveys the moist grain across the top of the grain dryer. The moist grain conveyed across the top of the dryer by the auger 36 then falls by gravity downwardly across opposite sides of a divider plate 38 toward the grain columns 40. The grain columns 40 extend vertically downward across opposite sides of the air plenum chamber 34 and are defined by inner porous walls 42 that surround the air plenum chamber 34, outer porous walls 44 and divider plates 46 between adjacent grain columns. The grain columns 40 extend downwardly around opposite sides of the air plenum chamber 34 directing the moist grain across the opposite sides of the air plenum chamber to a lower channel containing the lower auger 48. The lower auger 48 conveys the dried grain across the bottom of the grain dryer to an exterior conveyor that transports the dried grain away from the dryer.

In the preferred embodiment of the invention the heat exchanger is assembled directly to the exterior of the grain dryer. The heat exchanger can be retrofit to an existing grain dryer or can be included as a component part of a grain dryer as it is manufactured.

The heat exchanger is comprised of a plurality of heat exchange columns 50 that extend vertically downward across opposite sides of the grain dryer. The heat exchange columns 50 are formed from pairs of heat conducting walls 52 that are mounted over the outer porous wall 44 of each grain column. In the preferred embodiment the heat conductive walls 52 are narrow panels of sheet metal that are assembled over the grain columns 40 in the same manner in which the grain columns are constructed. The heat conductive walls 52 can be secured to the component parts of the grain columns 40 in the same manner as the component parts of the grain columns are assembled to each other.

Figure 7:
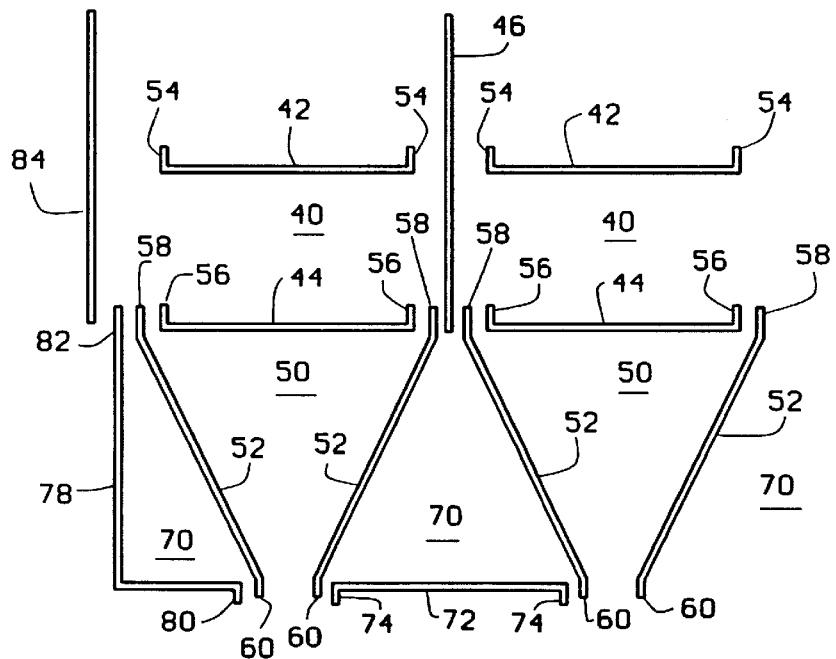
FIG. 7 is an exploded view of a partial cross section of the plenum, grain columns, heat exchange columns, and ambient air columns showing how they are arranged and connected relative to one another on an existing grain dryer.

An example of the assembly of the heat conductive panels 52 over the outer porous wall 44 of a grain column 40 is illustrated in FIG. 7. FIG. 7 shows inner porous walls 42 of a pair of adjacent grain columns 40, their outer porous walls 44 and their divider plates 46. The inner porous walls 42 have opposite bent edges 54 that are connected between adjacent divider plates 46 and the outer porous walls 44 also have opposite bent edges 56 that are connected between the adjacent divider plates 46. In the construction of the grain dryer the bent edges of the walls can be connected to the divider plates in any conventional manner such as by sheet metal screws, by nut and bolt fasteners, by spot welds, etc. In a like manner the heat conductive walls 52 of the heat exchange column can also be connected to the divider plates. The heat conductive walls 54 have bent inner edges 58 and bent outer edges 60. In assembling the heat conductive walls 52 to the grain dryer, the inner edges 58 of the walls are secured between the outer edges 56 of the outer porous wall and the adjacent divider plates 46 of the grain columns. Again, these connections can be made by the same attachment method employed in constructing the grain columns of the grain dryer. The outer edges 60 of the conductive walls are also connected together using the same method of attachment. The opposite bent edges 58,60 of the heat conductive walls 42 form the heat exchange columns 50 between the conductive walls 52 and the outer porous wall 44 of the grain column. As seen in FIG. 7, the heat exchange column 50 has an interior column 62 with a generally triangular configuration due to the shapes of the edges of the conductive walls.

In referring to FIG. 2, it can be seen that each heat exchange column 50 is constructed from four pairs of heat conductive walls 52, three pair of which are assembled to sections of the outer porous wall 44 of the grain columns in the manner described above. The top most pair of walls 52T of each column is constructed in the manner shown in FIG. 8. The inner edges 58T of the top pair of walls of each column are secured to each other adjacent a pivoting panel 110 that is yet to be described. The outer edges 60T of the top most walls are secured together in the same manner as the other three pairs of conductive walls. The pivoting panels 110 are separate from the top walls 52T of the heat exchange columns 50. The four pairs of heat conductive walls 52 are joined together end to end at miter joints 62 to form each heat exchange column 50. Each column extends vertically along and outside of each outer porous wall 44 of the grain columns 40. A triangular drain opening 64 is left at the bottom of each heat exchange column 50 to allow the removal of condensate and fines and a triangular exhaust opening 66 is left at the top of each heat exchange column to exhaust moisture laden air.

Ambient air columns 70 of the heat exchanger are formed between adjacent heat exchange columns 50 below the top most walls 52T of the heat exchange columns. The ambient air columns 70 are formed by external walls 72 mounted over the adjacent heat conductive walls 52 of two heat exchange columns 50 between which each ambient air column 70 is formed. As seen in FIG. 7, the external walls 72 have opposite bent edges 74 that are attached to the outer edges 60 of the adjacent heat exchange columns 50. This forms each ambient air column 70 with an internal volume having a triangular cross-section.

Figure 6:
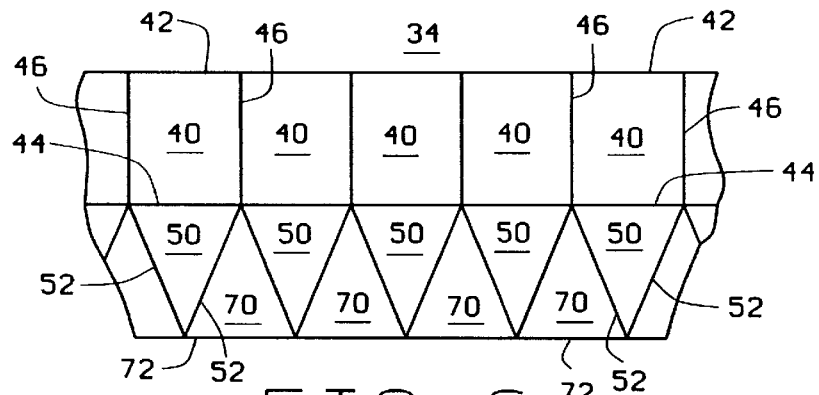
FIG. 6 is a partial, cross-sectional view of the grain dryer of FIG. 3 in a plane along line 6—6 of FIG. 3.

At the opposite front and back of the heat exchanger, angled external walls 78 form partial ambient air columns. The angled exterior walls have opposite bent 80 and straight 82 edges. The bent edges 80 of the angled walls are connected to the outer edges 60 of the adjacent conductive walls 52T of the adjacent heat exchange columns. The straight edges 82 of the angled walls are connected to the inner edges 58 of the conductive walls of the heat exchange columns and to an edge of the back wall 84 or front wall 86 of the grain dryer. The cross-section configurations of the grain columns 40, the adjacent heat exchange columns 50 and the alternating ambient air columns 70 is shown in FIG. 6.

In viewing FIG. 2 it can be seen that each ambient air column 70 is made up of three sections of external walls 72 connected together end-to-end and connected between the outer edges 60 of adjacent heat exchange columns 50. The topmost external wall 72 of each ambient air column 70 ends at the mitered connection between the top two pairs of conductive walls 52T that make up each heat exchange column 50. This leaves an inlet opening 88 into each ambient air column 70 at the top of each ambient air column. Each ambient air column is also provided with a triangular bottom wall 89 closing the bottom of each column and an adjacent outlet opening 90 at its bottom end. The outlet opening 90 of each ambient air column communicates with an air manifold 92 that extends across the bottom of the grain dryer on opposite sides of the grain dryer. The air manifolds 92 communicate with an enclosed air directing conduit 94 that in turn communicates with the housing of the blower 32. In the preferred embodiment of the invention, the air manifold 92 and the air directing conduits 94 are all constructed of the same materials as the grain dryer and the heat exchange columns and ambient air columns of the heat exchanger.

Figure 3:
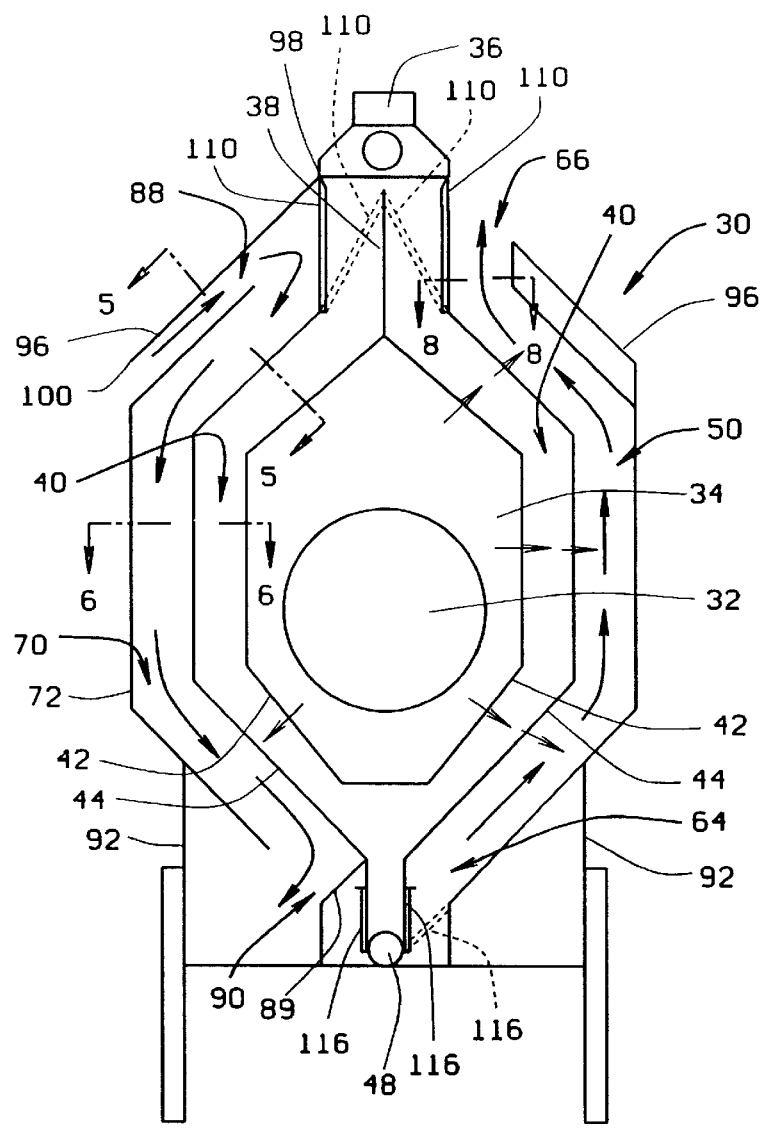
FIG. 3 is a cross-sectional end view of the schematic representation of the grain dryer of FIG. 2.

Roof panels 96 cover over the heat exchanger on opposite sides of the grain dryer. As best seen in FIGS. 2–3, the roof panels 96 have top edges 98 that are attached to the top edges of the heat exchange columns 50 giving the roof panel top edges a serrated appearance. The triangular exhaust opening 66 of the heat exchange columns 50 border the top edges 98 of the roof panels. The roof panels 96 extend downwardly to their bottom edges 100 that are spaced above the sides of the heat exchanger. The roof panels 96 are supported above the top sections of the ambient air columns 70 by struts (not shown) that extend between the undersides of the roof panels 96 and the divider plates 46 of the grain columns. Thus, the configurations of the roof panels 96 do not prevent rain from the exterior environment of the grain dryer from entering the heat exchange columns 50 through the exhaust openings 66, but do prevent rain from entering the ambient air columns 70 through their inlet openings 88.

Figure 8:
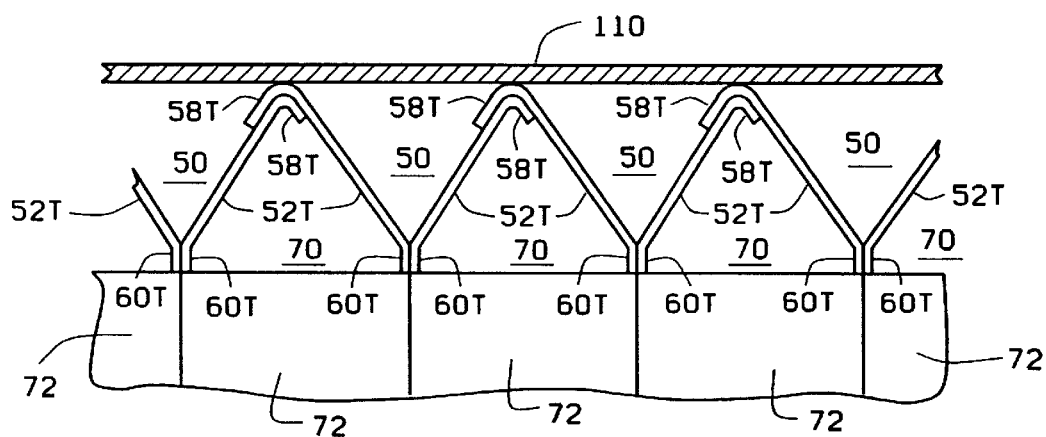
FIG. 8 is a partial cross section view of a pivoting panel at the top most sections of the heat exchange columns.
Figure 4:
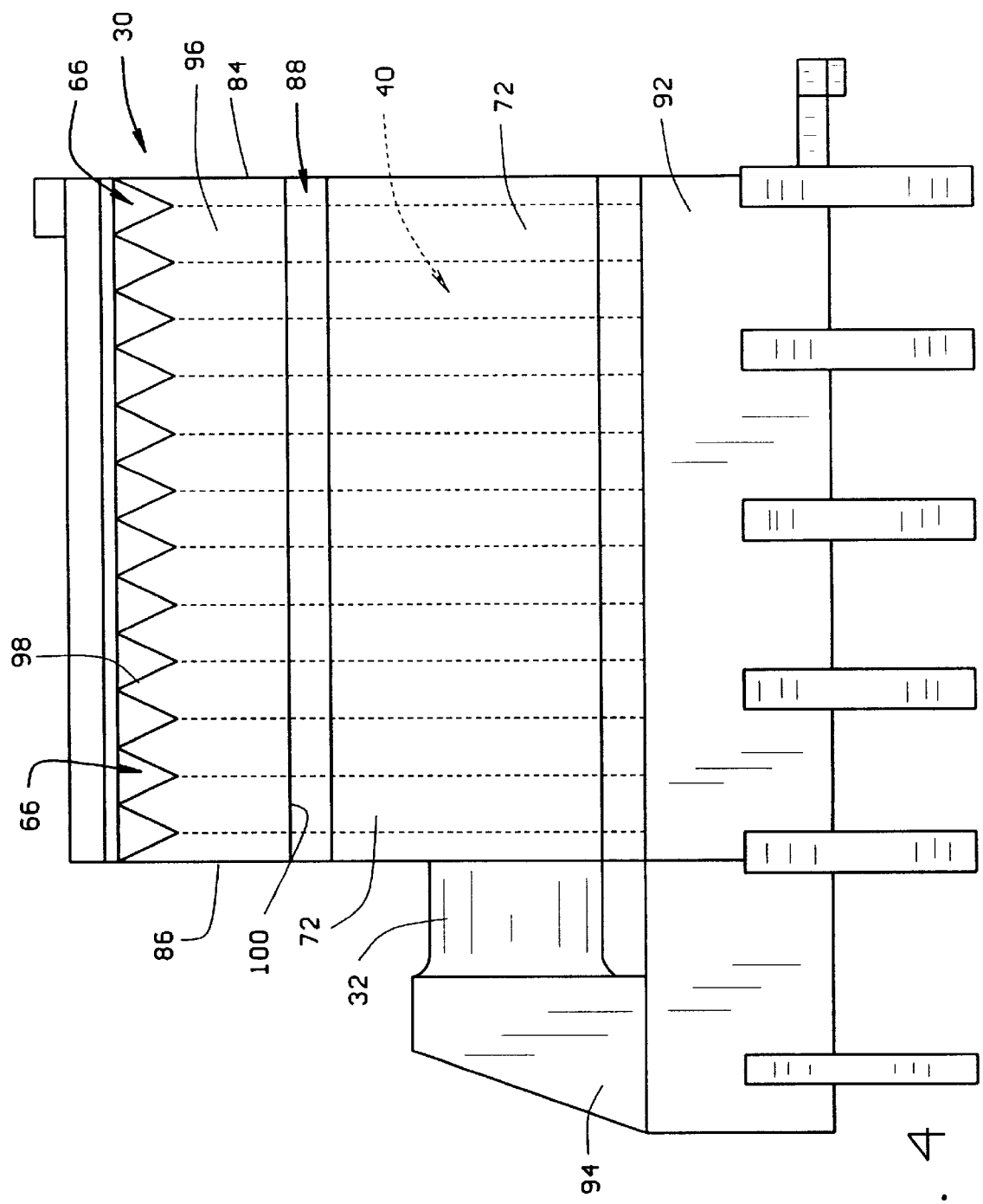
FIG. 4 is a side view of the schematic representation of the of a grain dryer of FIG. 2 with the heat exchanger of the present invention.

Referring to FIGS. 3 and 8, a pair of pivoting panels 110 are mounted at the tops of each of the grain columns 14 on opposite sides of the air plenum 16. The pivoting panels 110 are mounted along the top edges of the outer porous walls 44 of each of the grain columns by pivot connections 112. Each of the panels 110 extends along the entire length of the grain dryer and is spaced outwardly from the divider plate 38 that also extends along the length of the grain dryer at the center of the grain dryer. The pivoting panels 110 are selectively controlled by a mechanical actuator (not shown)to pivot between closed positions shown in solid lines in FIG. 3 and opened positions where they engage against the top edge of the divider plate 38 shown in dashed lines in FIG. 3. The mechanical actuator employed to control the pivoting movement of the panels 110 may be of any commercially available type of pivoting actuator. As seen in FIGS. 3 and 8, when the pivoting panels 110 are in their closed positions shown in solid lines in FIG. 3 they separate the top of the interior volume of the grain dryer 114 from upper portions of each of the heat exchange columns 50 adjacent the exhaust openings 66 of the heat exchange columns. When the actuators of the pivoting panels 110 are operated to cause the panels to move to their opened positions shown in dashed lines in FIG. 3 they communicate the top of the interior volume of the grain dryer 114 with the interior volumes of the heat exchange columns 50 at the tops of the columns. The tops of the ambient air columns 70 remain isolated from the top interior volume of the grain dryer 114 regardless of the position of the pivoting panels 110 as can be seen in FIG. 8. With the pivoting panels 110 moved to their opened positions shown by dashed lines in FIG. 3, the panels channel a flow of grain distributed through the top interior volume of the grain dryer 114 by the top auger 12 downwardly through the interiors of the heat exchange columns 50. Channeling a flow of grain through the heat exchange columns 50 is done to scrub the column interiors of grain fines and condensed moisture that will collect in the interiors of the columns during operation of the grain dryer.

A pair of pivoting doors 116 is provided at the bottom of the grain dryer where the grain columns 14 come together and channel grain to the bottom auger 48. The pivoting doors 116 extend the entire length of the grain dryer. The pair of pivoting doors 116 separate the bottom of the grain columns 14 from the bottoms of the heat exchange columns 50. The pivoting doors 116 are selectively operated by mechanical actuators to move between their closed positions shown in solid lines in FIG. 3 and their opened positions shown in dashed lines in FIG. 3. Mechanical actuators employed to control the pivoting movements of the doors 116 are any type of commercially available actuators. In the closed positions of the doors 116 shown in solid lines in FIG. 3 they direct the grain pouring downwardly through the grain columns 14 to the bottom auger 48. In this position of the pivoting doors 116 any condensation in the heat exchange columns 50 or any rain water that collects in the heat exchange columns 50 drains downwardly through the columns and out of the grain dryer through the bottom openings 64 of the heat exchange columns. When the pivoting doors 116 are moved to their opened positions shown in dashed lines in FIG. 3 the interiors of the heat exchange columns 50 are communicated with the bottoms of the grain columns 14 and the lower auger 48. In the opened positions of the pivoting doors 116 any grain that is channeled downwardly through the heat exchange columns 50 by the pivoting panels 110 being moved to their opened positions shown in dashed lines in FIG. 3 will be directed by the pivoting doors 116 to the lower auger 48 where the grain employed in scrubbing the interior of the heat exchange columns 50 will be conveyed out of the grain dryer. When the scrubbing operation of the heat exchange columns 50 is completed, the pivoting panels 110 and the pivoting doors 116 are moved to their closed positions shown in solid lines in FIG. 3.

In operation, the grain dryer blower 32 blows air through a heating source (not shown), that heats the air to the desired temperature, through an air mixer (not shown) and then into the central air plenum 34. The blower 32 causes air pressure in the central air plenum 34 to exceed the atmospheric pressure of the exterior environment of the grain dryer 30. As shown schematically in FIG. 3, this forces the hot air outward through the inner porous walls 42 and into the plurality of grain columns 40. The hot air then passes around the grain falling downwardly through the plurality of grain columns 40, heating the grain and extracting moisture from the grain. The moisture laden heated air them exits the plurality of grain columns 40 through the outer porous walls 44. When the now moist and still hot air exits through the outer porous walls 44, it enters into the plurality of heat exchange columns 50 of the invention. Once in the plurality of heat exchange columns 50, the moist hot air flows upwardly through these columns to the exhaust openings 66 located adjacent to the top ends of the columns 50 and exits to the exterior environment of the grain dryer.

The ambient air being drawn into the grain dryer via the blower 32 originates from the exterior environment of the grain dryer 30. The ambient air passes beneath the roof panels 96 and enters the inlet openings 88 that are located adjacent to the top ends of the columns. The ambient air is drawn through the inlet openings 88 and into the ambient air columns 70. The ambient air then flows through the ambient air columns 70 in direct contact with the heat conductive walls 52 of the heat exchange column 50 and exits the ambient air columns 70 through the outlet openings 90 located adjacent to the bottom ends of the columns. The ambient air exiting through the outlet openings 90 then enters the manifold 92 and the air directing conduit 94 which directs the drawn air to the intake of the blower 32.

Figure 5:
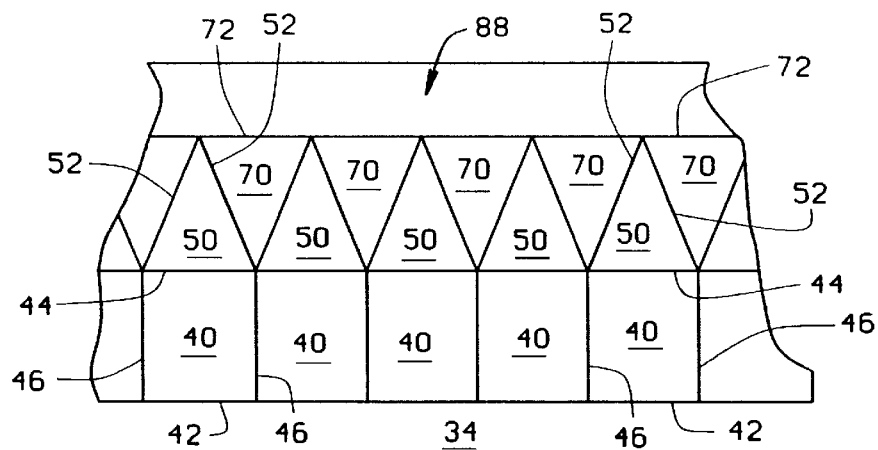
FIG. 5 is a partial, cross-sectional view of the grain dryer of FIG. 3 in a plane along the line 5—5 of FIG. 3.

An exchange of heat occurs between the moist hot exhaust air and the ambient air being drawn into the grain dryer 30 by the blower 32. The heat exchange occurs via the heat conductive walls 52. As can best be seen in FIGS. 5 and 6, the heat conductive walls 52 separate the ambient air columns 70 from the heat exchange columns 50. As can best be seen in FIG. 6, the heat exchanger utilizes alternating columns of ambient air columns 70 and heat exchange columns 50. While the moist hot exhaust air is flowing through the heat exchange columns 50 the ambient air is flowing in the opposite direction through the ambient air columns 70. The temperature differential between the moist hot exhaust air and the ambient air being drawn into the grain dryer causes heat to transfer from the moist hot exhaust air in the heat exchange columns 50, through the heat conductive walls 52 and to the ambient air being drawn through the ambient air columns 70. This allows the ambient air being drawn into the grain dryer 30 to be preheated prior to being drawn into the blower 32 and blown past the heating element.

During the heat exchange process the cooling of the moist hot exhaust air via extracting heat through the heat conductive walls 52 can cause moisture to condense on the heat conductive walls and also possibly on the outer porous walls 44. To allow for the moisture to drain from the heat exchange columns 50 the bottoms of the heat exchange columns are provided with the triangular openings 64. Additionally, the presence of condensation draining through the bottom openings 64 serves to indicate that heat transfer is occurring between the heat exchange columns and the ambient air columns. The preheating of the ambient air being drawn into the grain dryer 30 reduces the amount of energy necessary to raise the temperature of the air entering the central air plenum 34 to the desired level. Therefore, the energy consumption of the grain dryer 30 is reduced. Additionally, another key advantage of this invention is that the ambient air being drawn into the grain dryer 30 does not mix with the moist hot exhaust air and therefore does not have its moisture holding capability reduced like the heat recovery systems of the prior art.

While the invention has been described with the heat exchange columns 50 and ambient air columns 70 having triangular cross sectional areas, it is to be understood that any configuration of the ambient air columns and the heat exchange columns may be utilized to effectuate efficient heat transfer and still be within the scope of the invention.

This modular assembly for the heat exchanger allows for the heat exchanger to be designed for and easily installed on existing grain dryers. Since the grain columns on existing grain dryers come in varying widths, the modular approach can easily be designed and installed on existing drain dryers.

The preferred method of attaching the heat exchanger to existing grain dryers is via bolting onto and through the inner panels. While bolts are the preferred method, it is to be understood that any method for attaching or fastening the component pieces together are within the scope of this invention.

While the present invention has been described by reference to specific embodiments, it should be understood that modifications and variations of the invention may be constructed without departing from the scope of the invention defined in the following claims.

What is claimed:

1. A grain dryer comprising:
   a central air plenum;
   a plurality of grain columns extending across opposite sides of the air plenum, each grain column having an inner porous wall separating the grain column from the air plenum and an outer porous wall spaced outwardly from the inner porous wall and the air plenum;
   a plurality of heat exchange columns extending along the grain columns, the heat exchange columns having heat conductive walls mounted over the outer porous walls of the grain columns and enclosing interior volumes of the heat exchange columns that communicate with the grain columns through the outer porous walls; and,
   a plurality of ambient air columns extending along the heat exchange columns, the ambient air columns having external walls mounted over the heat conductive walls of the heat exchange columns and enclosing interior volumes of the ambient air columns that receive heat from the heat exchange columns through the heat conductive walls.

2. The grain dryer of claim 1, wherein:
   the grain columns, the heat exchange columns and the ambient air columns are all vertically oriented columns.

3. The grain dryer of claim 1, wherein:
   the grain columns, the heat exchange columns and the ambient air columns have opposite top and bottom ends, the heat exchange columns have exhaust openings to an exterior environment of the grain dryer adjacent the top ends of the heat exchange columns and the ambient air columns have inlet openings in the exterior environment of the grain dryer adjacent the top ends of the ambient air columns.

4. The grain dryer of claim 3, wherein:
   the heat exchange columns have condensation drain closures adjacent the bottom ends of the heat exchange columns.

5. The grain dryer of claim 3, wherein:
   a blower is mounted on the grain dryer to blow air into the plenum and the blower is connected in communication with the ambient air columns to draw air from the ambient air columns.

6. The grain dryer of claim 5, wherein:
   the ambient air columns have outlet openings adjacent the bottom ends of the ambient air columns and a manifold is connected to the bottom ends of the ambient air columns and communicates the outlet openings of the ambient air columns with the blower.

7. The grain dryer of claim 1, wherein:
   the heat conductive walls of the heat exchange columns completely enclose the grain columns from an exterior environment of the grain dryer.

8. The grain dryer of claim 1, wherein:
   the heat conductive walls in at least a portion of each heat exchange column includes a pair of heat conductive walls that are connected with each other and are connected to an adjacent outer porous wall in a manner that gives the portion of the heat exchange column a triangular cross section.

9. The grain dryer of claim 1, wherein:
   the external walls in at least a portion of each ambient air column include an external wall connected between a pair of adjacent heat conductive walls that are connected to each other in a manner that gives the portion of the ambient air column a triangular cross section.

10. The grain dryer of claim 1, wherein:
   the plurality of heat exchange columns and the plurality of ambient air columns are arranged side by side in an alternating arrangement, the external walls in at least a portion of adjacent ambient air columns are positioned parallel to outer porous walls of adjacent grain columns and are connected to the outer porous walls by heat conductive walls of adjacent heat exchange columns.

11. The grain dryer of claim 10, wherein:
   the heat conductive walls of the adjacent heat exchange columns are oriented at a same angle relative to the external walls of the adjacent ambient air columns and the outer porous walls of the adjacent grain columns.

12. The grain dryer of claim 1, wherein:
   at least one pivoting panel is positioned inside the grain dryer above the grain columns, the pivoting panel is moveable between open and closed positions relative to the grain column where in the open position the pivoting panel directs grain from the grain columns through the heat exchange columns and in the closed position the pivoting panel separates the grain columns from the heat exchange columns.

13. The grain dryer of claim 1, wherein:
   the heat conductive walls are nonporous walls and the external walls are nonporous walls.

14. A grain dryer heat exchanger that is designed for assembly to a grain dryer having a blower mounted to the grain dryer to blow air into a central air plenum of the dryer, and a plurality of grain columns extending across opposite sides of the air plenum, each grain column having an inner porous wall separating the grain column from the air plenum and an outer porous wall spaced outwardly from the inner porous wall, the heat exchanger comprising:

a plurality of heat conductive walls mountable over the outer porous walls of the grain columns forming a plurality of heat exchange columns extending along the grain columns, the heat exchange columns having interior volumes that communicate with the grain columns through the outer porous walls; and, a plurality of external walls mountable over the heat conductive walls of the heat exchange columns forming a plurality of ambient air columns extending along the heat exchange columns, the ambient air columns having interior volumes that receive heat from the heat exchange columns through the heat conductive walls.

15. The grain dryer heat exchanger of claim 14, wherein:

the grain columns, the heat exchange columns and the ambient air columns have opposite top and bottom ends, the heat exchange columns have exhaust openings to an exterior environment of the grain dryer adjacent the top ends of the heat exchange columns and the ambient air columns have inlet openings in the exterior environment of the grain dryer adjacent the top ends of the ambient air columns.

16. The grain dryer heat exchanger of claim 15, wherein:

a manifold is assembled to the external walls of the ambient air columns and is mountable to the blower of the grain dryer to draw a flow of air through the ambient air columns and deliver the flow of air to the blower.

17. The grain dryer heat exchanger of claim 16, wherein:

the ambient air columns have outlet openings through the external walls adjacent the bottom ends of the ambient air columns and the manifold communicates with the outlet openings.

18. The grain dryer heat exchanger of claim 14, wherein:

the heat exchange columns have condensation drain closures adjacent the bottom ends of the heat exchange columns.

19. The grain dryer heat exchanger of claim 14, wherein:

the heat conductive walls of the plurality of heat exchange columns completely enclose the grain columns of the grain dryer when the heat conductive walls are mounted over the outer porous walls of the grain dryer.

20. The grain dryer heat exchanger of claim 14, wherein:

the heat conductive walls in at least a portion of each heat exchange column includes a pair of heat conductive walls that are connected with each other and are connected to an adjacent outer porous wall in a manner that gives the portion of the heat exchange column a triangular cross section.

21. The grain dryer heat exchanger of claim 14, wherein:

the external walls in at least a portion of each ambient air column include an external wall connected between a pair of adjacent heat conductive walls that are connected to each other in a manner that gives the portion of the ambient air column a triangular cross section.

22. The grain dryer heat exchanger of claim 14, wherein:

the plurality of heat exchange columns and the plurality of ambient air columns are arranged side by side in an alternating arrangement, the external walls in at least a portion of adjacent ambient air columns are positioned parallel to outer porous walls of adjacent grain columns and are connected to the outer porous walls by heat conductive walls of adjacent heat exchange columns.

23. The grain dryer heat exchanger of claim 14, wherein:

at least one pivoting panel is positioned inside the grain dryer above the grain columns, the pivoting panel is moveable between open and closed positions relative to the grain column where in the open position the pivoting panel directs grain from the grain columns through the heat exchange columns and in the closed position the pivoting panel separates the grain columns from the heat exchange columns.

24. The grain dryer heat exchanger of claim 14, wherein:

the heat conductive walls are nonporous walls and the external walls are nonporous walls.

\* \* \* \* \*